US012341312B2

(12) United States Patent
Houry et al.

(10) Patent No.: US 12,341,312 B2
(45) Date of Patent: Jun. 24, 2025

(54) FRETTING CORROSION-FREE IN-LINE CONNECTION SYSTEM

(71) Applicant: Connecteurs Electriques Deutsch, Evreux (FR)

(72) Inventors: Laurent Houry, Evreux (FR); Thierry Cassar, Evreux (FR); Fabien Houvenaghel, Evreux (FR); Sébastien Queva, Evreux (FR)

(73) Assignee: Connecteurs Electriques Deutsch, Evreux (FR)

( * ) Notice: Subject to any disclaimer, the term of this patent is extended or adjusted under 35 U.S.C. 154(b) by 483 days.

(21) Appl. No.: 17/830,408

(22) Filed: Jun. 2, 2022

(65) Prior Publication Data

US 2022/0302611 A1 Sep. 22, 2022

Related U.S. Application Data

(63) Continuation of application No. PCT/EP2020/083681, filed on Nov. 27, 2020.

(30) Foreign Application Priority Data

Dec. 2, 2019 (EP) .................................... 19306544

(51) Int. Cl.

| | |
|---|---|
| ***H01R 9/00*** | (2006.01) |
| ***H01R 4/48*** | (2006.01) |
| ***H01R 9/24*** | (2006.01) |
| ***H01R 9/26*** | (2006.01) |
| ***H01R 13/20*** | (2006.01) |

(52) U.S. Cl.

CPC ........... *H01R 9/2416* (2013.01); *H01R 4/489* (2013.01); *H01R 9/26* (2013.01); *H01R 13/20* (2013.01)

(58) Field of Classification Search

CPC ........ H01R 9/2416; H01R 4/489; H01R 9/26; H01R 13/20

See application file for complete search history.

(56) References Cited

U.S. PATENT DOCUMENTS 6,186,670 B1 2/2001 Austin et al.
6,554,484 B2 * 4/2003 Lampert .............. G02B 6/3895 439/489

(Continued)

FOREIGN PATENT DOCUMENTS

DE 102012018271 A1 3/2014
DE 102016004429 A1 10/2017

(Continued)

OTHER PUBLICATIONS

PCT Search Report and Written Opinion, Application No. PCT/EP2020/083681, Dated: Jan. 26, 2021, 14 pages.

(Continued)

*Primary Examiner* — Phuong Chi Thi Nguyen
(74) *Attorney, Agent, or Firm* — Barley Snyder

(57) ABSTRACT

A terminal cassette for electrically connecting a plurality of feeder cables includes an electrical connector with a plurality of electrical contacts and a double locking system securing a feeder cable cassette. The double locking system has a locking bracket and a sliding locking device. The locking bracket pivots and engages the feeder cable cassette. The sliding locking device secures the locking bracket in a locked position.

19 Claims, 11 Drawing Sheets

(56) References Cited

U.S. PATENT DOCUMENTS

| | | | |
|---|---|---|---|
| 8,016,602 | B2 | 9/2011 | Wadoux |
| 2016/0126644 | A1 | 5/2016 | Yamada |
| 2016/0274311 | A1 | 9/2016 | Verheyden et al. |
| 2017/0133790 | A1 | 5/2017 | Yamane et al. |

FOREIGN PATENT DOCUMENTS

| | | | |
|---|---|---|---|
| DE | 202017107202 | U1 | 10/2021 |
| EP | 2120297 | A1 | 11/2009 |

OTHER PUBLICATIONS

Extended European Search Report, Application No. 19306544.8-1201, Dated: May 28, 2020, 8 pages.

Examination Report from the European Patent Office dated Jan. 30, 2023, corresponding to Application No. 19 306 544.8-1201, 6 pages.

* cited by examiner

FRETTING CORROSION-FREE IN-LINE CONNECTION SYSTEM

CROSS-REFERENCE TO RELATED APPLICATIONS

This application is a continuation of PCT International Application No. PCT/EP2020/083681, filed on Nov. 27, 2020, which claims priority under 35 U.S.C. § 119 to European Patent Application No. 19306544.8, filed on Dec. 2, 2019.

FIELD OF THE INVENTION

The invention relates to a power connection system that is suitable for use under strongly varying environmental conditions and designed to provide modular electrical power connections.

BACKGROUND

Electrical wiring in modern aircraft must comply with a plurality of requirements. In addition to high safety standards that require highly reliable electrical connections, space and environmental requirements must be fulfilled as well. An electrical connection system for use in an aircraft must be suited to be installed and operate in a wide range of environmental conditions such as vibrations, varying temperatures, pressure, humidity, and the like. In addition, space and weight constraints must be observed. Finally, the connection system should provide protection against accidental electrical contact, against environmental hazards such as leakage of water or fuel, as well as damage from foreign object debris (FOD).

Conventional power connection systems follow the terminal block concept where multiple screw metallic terminals are installed on an insulating block. The screw terminals are separated by raised insulated barriers. An electrical connection between wires is then achieved by staking the corresponding wire end-fittings, e.g. terminal lugs, on the screw terminals and ensuring a strong mechanical contact between them using a self-locking nut installed on the terminal stud with a specific torque value.

A terminal block allows using a common power line for two or more electric consumers in an aircraft. Terminal blocks are provided with a mechanical interface for attaching them to the aircraft structure. Generally, an insulation cover is installed on top of the terminal screws to protect the energized parts from accidental contact or from FOD damage. The insulation cover is installed to protect multiple lines in one step. It is fixed by screws that must be screwed with a specific coupling torque, and must be secured by a lock wire and a visual stamp stuck across the cover and the lock wire. For maintenance of even a single line, the insulation cover for all the lines must be removed. Both installation and maintenance are therefore time consuming. In addition, a new lock wire is needed for each maintenance.

Conventional terminal blocks are attached to the secondary structure of the aircraft using a mechanical interface by metallic screws. The secondary structure is generally a metallic interface panel which is attached to the primary structure of the aircraft.

Conventional terminal blocks using terminal lugs to provide the desired electrical connection are time-consuming to install and generally require a specific coupling torque to ensure good electrical contact between lugs connected to the same terminal stud. During installation, there is a relatively high risk of damaging an anti-corrosive plating of the lugs. In addition, vibration of the terminal block, for instance when installed in a strongly vibrating environment such as aircraft, leads to fretting corrosion of the lugs. Furthermore, a human operator installing the terminal block may risk receiving an electrical shock or being injured by sharp edges of the terminal block. Furthermore, the use of small, potentially loose parts such as screws poses a risk of generating FOD. Finally, repair of the cable terminals is inefficient due to the use of terminal lugs.

SUMMARY

A terminal cassette for electrically connecting a plurality of feeder cables includes an electrical connector with a plurality of electrical contacts and a double locking system securing a feeder cable cassette. The double locking system has a locking bracket and a sliding locking device. The locking bracket pivots and engages the feeder cable cassette. The sliding locking device secures the locking bracket in a locked position.

BRIEF DESCRIPTION OF THE DRAWINGS

The invention will now be described by way of example with reference to the accompanying Figures, of which.

DETAILED DESCRIPTION OF THE EMBODIMENT(S)

Features and exemplary embodiments as well as advantages of the present disclosure will be explained in detail with respect to the drawings. It is understood that the present disclosure should not be construed as being limited by the description of the following embodiments. It should furthermore be understood that some or all the features described in the following may also be combined in alternative ways.

Figure 1:
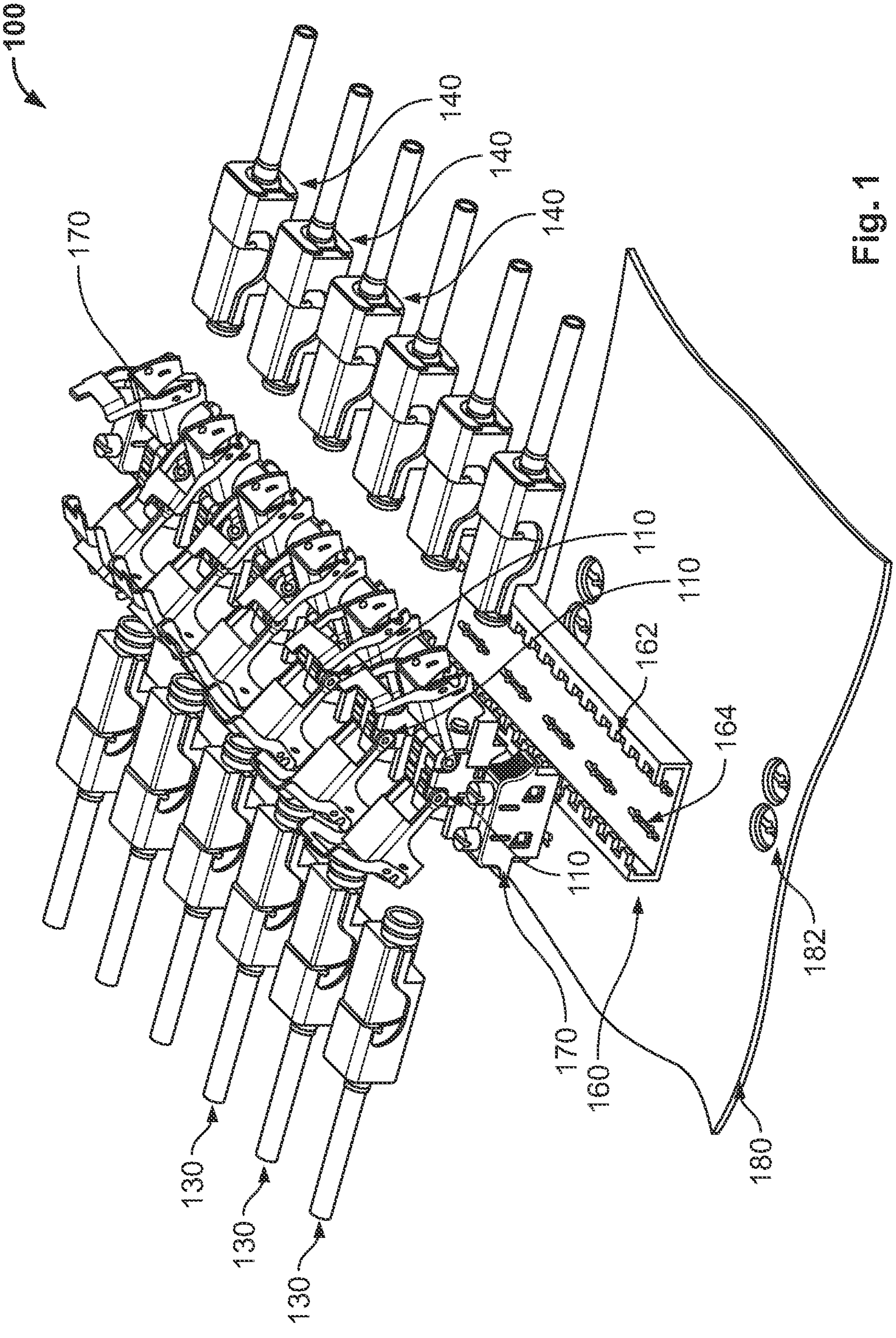
FIG. 1 is an exploded perspective view of a power connection system according to the present invention.
Figure 2:
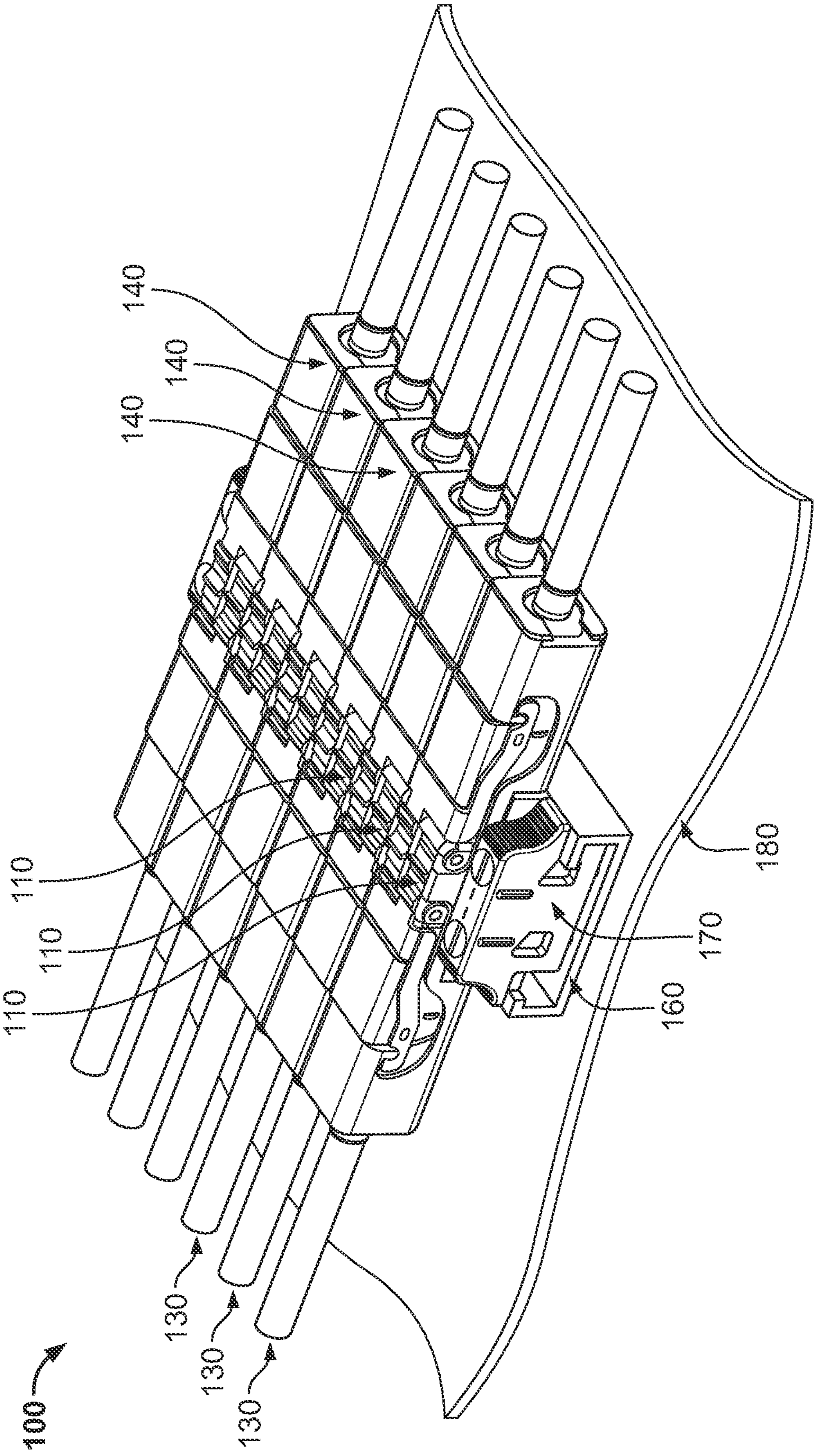
FIG. 2 is a perspective view of the power connection system in an assembled state.

FIG. 1 shows an exploded schematic view of a power connection system 100 according to the present invention. FIG. 2 shows the same power connection system 100 in an assembled state.

The exemplary power connection system 100 comprises a plurality of terminal cassettes 110 that are mounted on a modular rail fixture 160 by positive locking. As shown in FIG. 1, the modular rail fixture 160 comprises a plurality of teeth-like engaging elements 162 to provide a positive fit with corresponding elements of the terminal cassettes 110. A more detailed view of the positive locking can be seen in the cross-sectional view of FIG. 5*b*. In the non-limiting, illustrative embodiment of FIGS. 1 and 2, the terminal cassettes 110 are inserted through the openings between the teeth-like engaging elements 162 and slid along the modular rail 160 to establish positive locking between the terminal cassettes 110 and the modular rail fixture 160.

First, an end clamp fixture 170 is installed at one end of the modular rail 160 wherein pins of the end clamp fixture 170 are inserted through holes 164 of the modular rail 160. Subsequently, a desired number of terminal cassettes 110 are inserted and slid along the modular rail 160 until touching the end clamp fixture 170 and each other. The number of terminal cassettes 110 can be freely chosen as long as it is compatible with the length of the modular rail 160. Finally, a second end clamp fixture 170 is inserted with its pins through respective holes 164 of the modular rail 160 in close contact with the last terminal cassette 110 in the line to secure the positive lock of the terminal cassettes 110 with the modular rail fixture 160.

The end clamp fixture 170 may be formed as an integral part of the modular rail fixture 160 or may be mechanically connected to the modular rail fixture 160 by positive locking and/or mechanical connection elements such as one or more pins. By way of example, end clamp fixtures 170 with one or more pins reaching through corresponding through holes of the modular rail 160 may be provided wherein the pins may be fixed to a support structure 180 of the respective installation environment by riveting and/or press fitting.

The modular rail fixture 160, with the terminal cassettes 110 installed onto it, may then be mounted on a supporting structure 180 by inserting the pins of the end clamp fixtures 170 into respective holes 182 of the supporting structure 180. The pins may then be locked using round inserts as shown in FIG. 1 by turning the pins into a locked position. Alternative locking devices may be devised as required. A possible support structure 180 that is conventionally used in an aircraft environment may be a metallic plate, also known as umbrella.

The power connection system 100 according to the present invention provides electrical connection for a plurality of feeder cables 130 in a simple and robust way. To this end, each feeder cable 130 according to the illustrative embodiment of FIGS. 1 and 2 is inserted into a respective feeder cable cassette 140 that is configured to establish mechanical and electrical connection with a standardized mechanical and electrical interface of the terminal cassettes 110 as will be described in more detail below. The supporting structure 180 may be mounted in a known way on structures of the respective environment such as an aircraft or a car.

Figure 3B:
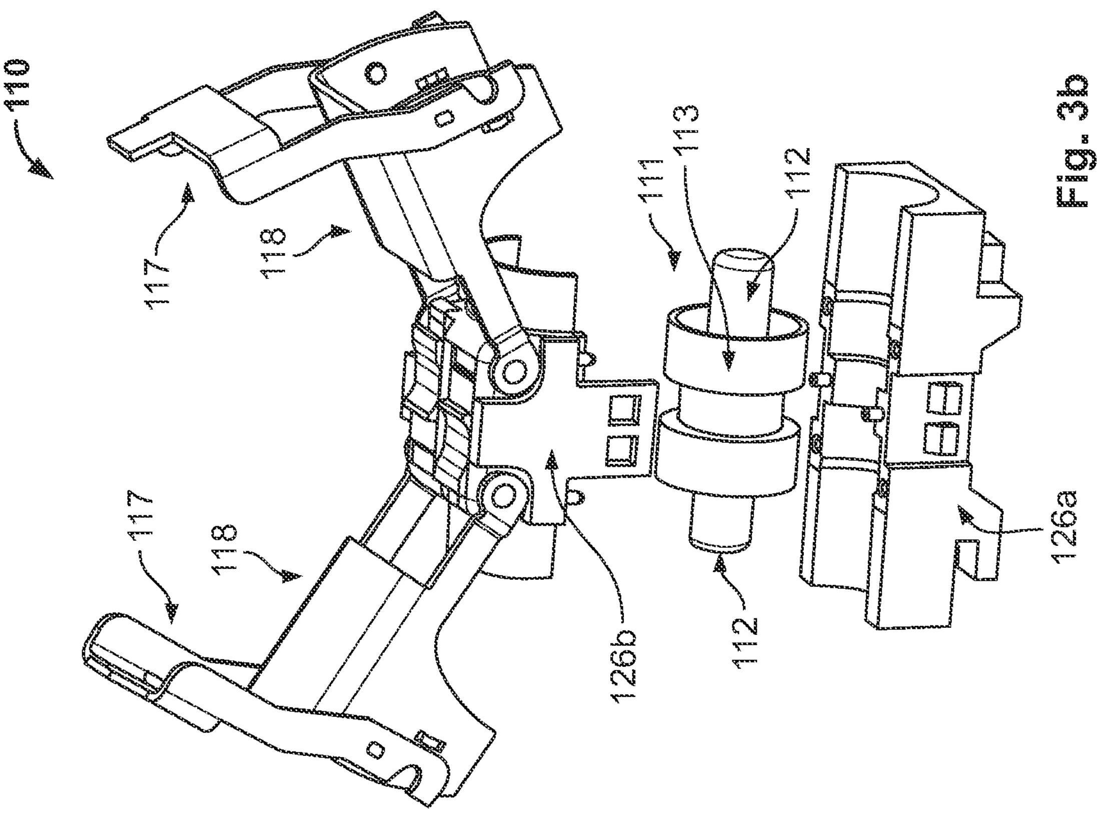
FIG. 3*b* is an exploded perspective view of the terminal cassette.
Figure 3A:
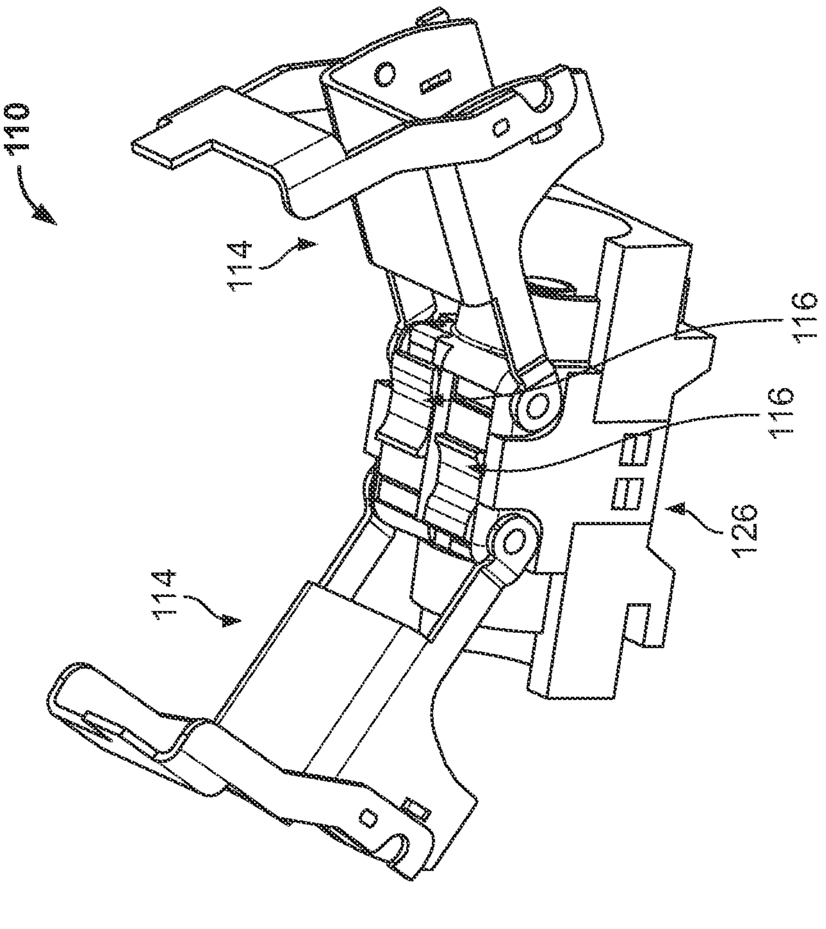
FIG. 3*a* is a perspective view of a terminal cassette according to an embodiment.

FIGS. 3*a* and 3*b* show schematic views of a terminal cassette 110 according to the present invention. FIG. 3*b* shows an exploded view of the terminal cassette 110 while FIG. 3*a* shows an assembled view. According to the illustrated, non-limiting embodiment of the terminal cassette 110, a body 126 is provided that includes an upper part 126*b* and a lower part 126*a*. Alternatively, the body 126 may be provided as an integral part, potentially together with the electrical connector 111.

In the embodiment shown in FIG. 3*b*, an electrical connector 111 with two male electrical contacts 112 is provided with a non-conductive insert 113, for instance made of a thermoplastic material, that surrounds part of the electrical contacts 112 to provide electrical insulation against the body parts 126*a* and 126*b*. The body 126 may be made of a metallic material to provide shielding against EMI. In this case, the non-conductive insert 113 prevents an electrical short between the electrical contacts 112 and the body 126 of the terminal cassette 110. Alternatively, the body parts 126*a* and 126*b* may be made of a non-conductive material that is metallized on the outside to provide shielding. The insert 113 and/or body 126 may be formed by a molding process.

As shown in FIGS. 3*a* and 3*b*, the upper and lower body parts 126*b* and 126*a* may be formed such that the male electrical contacts 112 are completely encapsulated with the exception of an opening for inserting a respective female electrical contact. To this end, the illustrated upper part 126*b* has a protective skirt for each male electrical contact 112. Alternatively, the electrical contacts 112 may be female contacts. Configuring all electrical contacts 112 for connection to feeder cable cassettes 140 as the same type allows using a standardized feeder cable cassette 140 to establish the electrical connection. However, a terminal cassette 110 may also comprise an electrical connector 111 with mixed, i.e. one or more female and one or more male, electrical contacts 112. The body 126 may be designed and configured to partly encase the at least two electrical contacts 112, in particular in such a way that a human operator is protected against electrical shock by accidentally touching the electrical contacts 112.

The terminal cassette 110 according to FIGS. 3*a* and 3*b* is a standardized modular terminal cassette for electrical connection of two feeder cables 130. In particular, the terminal cassette 110 provides identical mechanical and electrical interfaces on both sides of the terminal cassette 110. Consequently, a standardized feeder cable cassette 140 may be used to establish a mechanical and electrical connection with the terminal cassette 110.

The present disclosure in its simplest form provides a terminal cassette 110 for electrical connection of exactly two feeder cables 130 wherein the electrical contacts 112 of the electrical connector 111 are provided on opposite sides of the terminal cassette 110. The present invention is, however, not limited to a terminal cassette 110 for two opposing feeder cables 130 but provides terminal cassettes 110 for various arrangements of the feeder cables 130, such as on the same side of the terminal cassette 110, as well as for more than two feeder cables 130.

The embodiments described herein with respect to the terminal cassette 110 can thus be applied to the simplest version of two opposing electrical contacts 112 as well as more involved versions unless explicitly stated otherwise. In particular, as each electrical contact for connection to a respective feeder cable cassette 140 is provided with a corresponding double locking system 114, the following specific embodiments of the double locking system 114 can be applied to all variants of the terminal cassette 110.

According to the present invention, mechanical connection with a respective feeder cable cassette 140 is established by using a double locking system 114 for securing the respective feeder cable cassette 130. In the exemplary, non-limiting embodiment according to FIGS. 3*a* and 3*b*, the double locking system 114 comprises a locking bracket 117 and a cam 118. As can be seen in FIG. 3*b*, the cams 118 are pivotably mounted at the top of the upper body part 126*b*. The locking brackets 117 are pivotably mounted on the cams 118, more specifically on a distal part of each cam 118 with respect to the pivot point of the cam 118. Furthermore, the double locking system 114 includes sliding locking devices 116, i.e. in the form of a slider, to secure the locking brackets 117 in a locked position. The sliding locking devices 116 may be provided with a spring that automatically moves the sliding locking device 116 into a locked position where they secure a respective part of the locking brackets 117.

The locking bracket 117 is pivotably mounted on the cam 118 such that moving the locking bracket 117 into a locked position can be understood as a two-action process, namely moving the cam 118 into engagement with the feeder cable cassette 140 and subsequently, moving the locking bracket 117 into a locked position. The cam 118 may comprise corresponding levers for being pivotably mounted on the body of the terminal cassette 110. The cam 118 and/or the locking bracket 117 may be made of a metallic material such as a single metal or an alloy of metals. Alternatively, the cam 118 and/or the locking bracket 117 may be made of a robust non-metallic material such as a thermoplastic. The cam 118 and the locking bracket 117 may be designed and arranged at the terminal cassette 110 in such a way that they can be operated without interfering with the double locking system 114 of an adjacent terminal cassette 110.

The locking bracket 117 may in particular, be mounted on a distal part of the cam 118 with respect to a pivot point of the cam 118. In other words, the pivot point of the cam 118 and the pivot point of the locking bracket 117 may be arranged at different ends of the cam 118. This particular arrangement allows for a simple, yet strong mechanical engagement of the double locking system 114 with a respective feeder cable cassette 140.

Figure 8A:
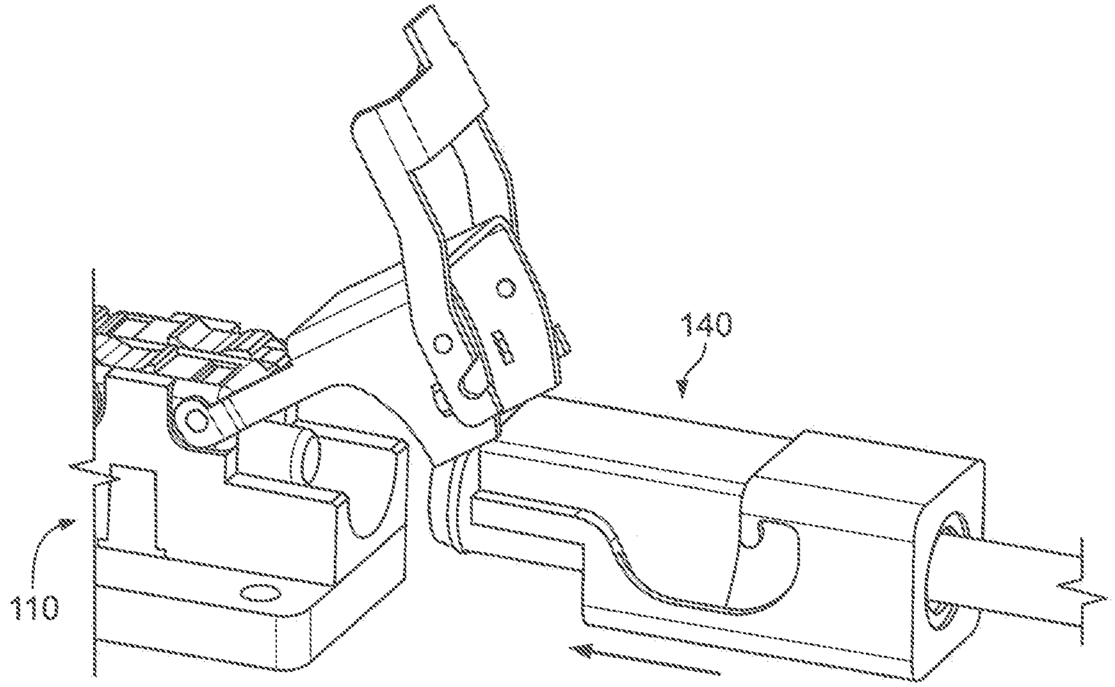
FIG. 8*a* is a perspective view of a first step of a process of connecting a feeder cable cassette to a terminal cassette.
Figure 8B:
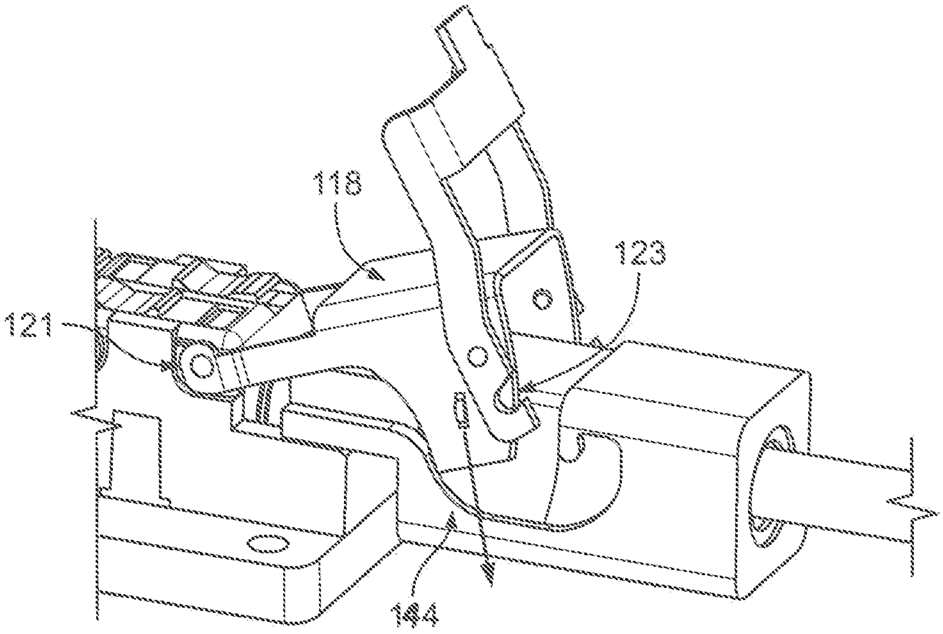
FIG. 8*b* is a perspective view of a second step of the process of connecting the feeder cable cassette to the terminal cassette.
Figure 8C:
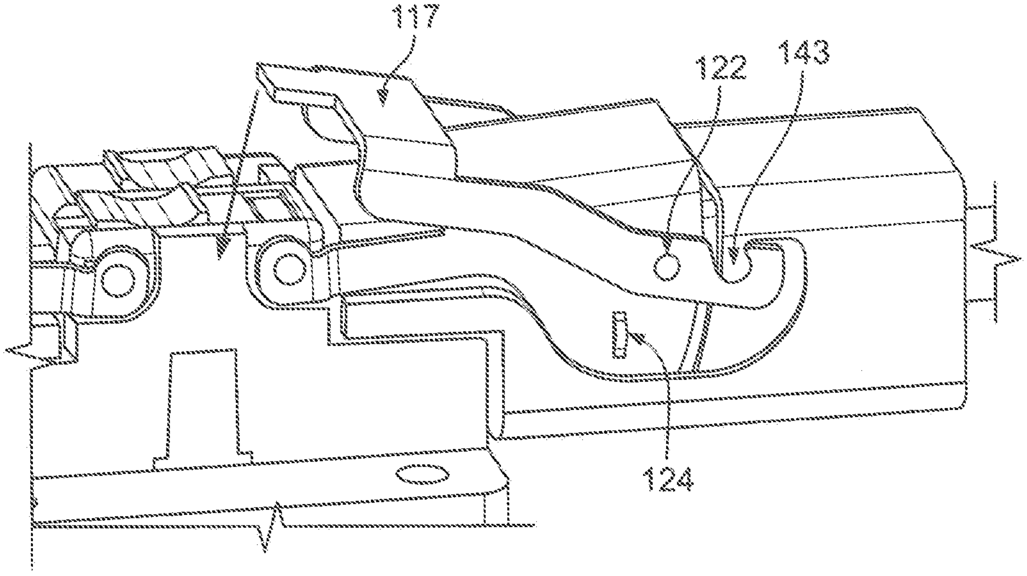
FIG. 8*c* is a perspective view of a third step of the process of connecting the feeder cable cassette to the terminal cassette.
Figure 8D:
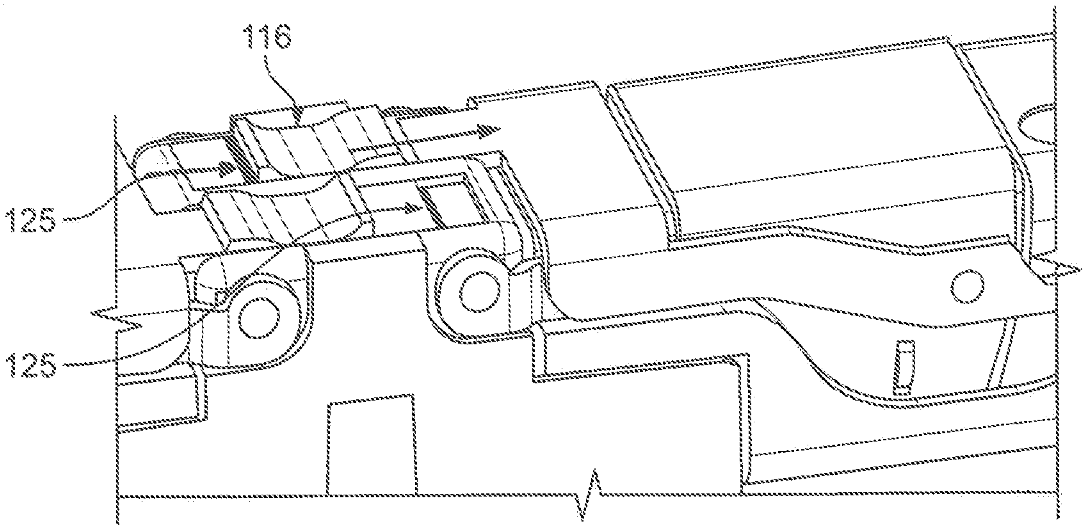
FIG. 8*d* is a perspective view of a fourth step of the process of connecting the feeder cable cassette to the terminal cassette.

As shown in detail in FIG. 8*d*, a visual control element 125 in form of a colored stripe is provided on the top of the upper body part 126*b* in such a way that it is visible only when the sliding locking device 116 is in the locked position. The double locking system 114 provides a very robust and reliable mechanical and electrical connection between the feeder cable cassettes 140 and the respective terminal cassettes 110 as will be described in more detail in the following.

The locking bracket 117 may be made of a material that allows elastic deformation by hand. More specifically, the part of the locking bracket 117 that will be blocked in the locked position by the sliding locking device 116 may be made of such an elastic material to provide a spring effect when in the locked position. In other words, pushing the locking bracket 117 by hand into the locked position may involve slightly deforming a part of the locking bracket 117, such as the protruding leaf or the entire lever arm on the side of the sliding locking devices 116, so as to provide the spring effect. As a consequence, when the deformed part of the locking bracket 117 is released by retracting the sliding locking device 116, the locking bracket 117 will automatically move out of the locked position such that a human operator can easily grab the locking bracket 117.

The residual mechanical stress due to the residual spring effect of the manually deformed locking bracket 117 or part of the locking bracket 117 provides a residual force on the feeder cable cassette 140 that pulls the electrical contact of the feeder cable 130 into abutment with the electrical contact of the terminal cassette 140 during all the connection lifetime on an aircraft. The result of this residual force is that the more the whole assembly is vibrating, the more the electrical contacts are kept in abutment. As a consequence, a risk of electric arcs due to fretting corrosion when vibrating is reduced and length differences due to machining of the involved parts as well as due to wear of the parts during use are compensated for. The double locking system 114 is therefore suitable for use in environments with very high safety standards such as aircraft. In addition, the residual spring effect makes it easier to reopen the locking bracket 117 for disconnecting the feeder cable cassette 140 from the terminal cassette 110. To this end, the sliding locking device 116 may be manually retracted to release the locking bracket 117. The elasticity of the locking bracket 117 may be chosen such that it is elastically deformed when manually, i.e. tool-lessly, pushing the locking bracket 117 into the locked position.

Figure 4A:
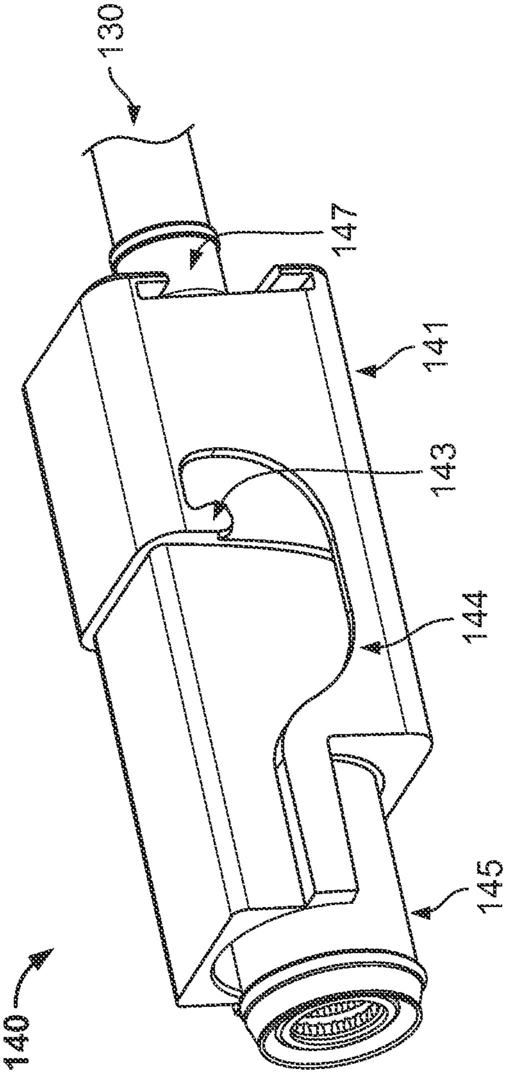
FIG. 4*a* is a perspective view of a feeder cable cassette according to an embodiment.
Figure 4B:
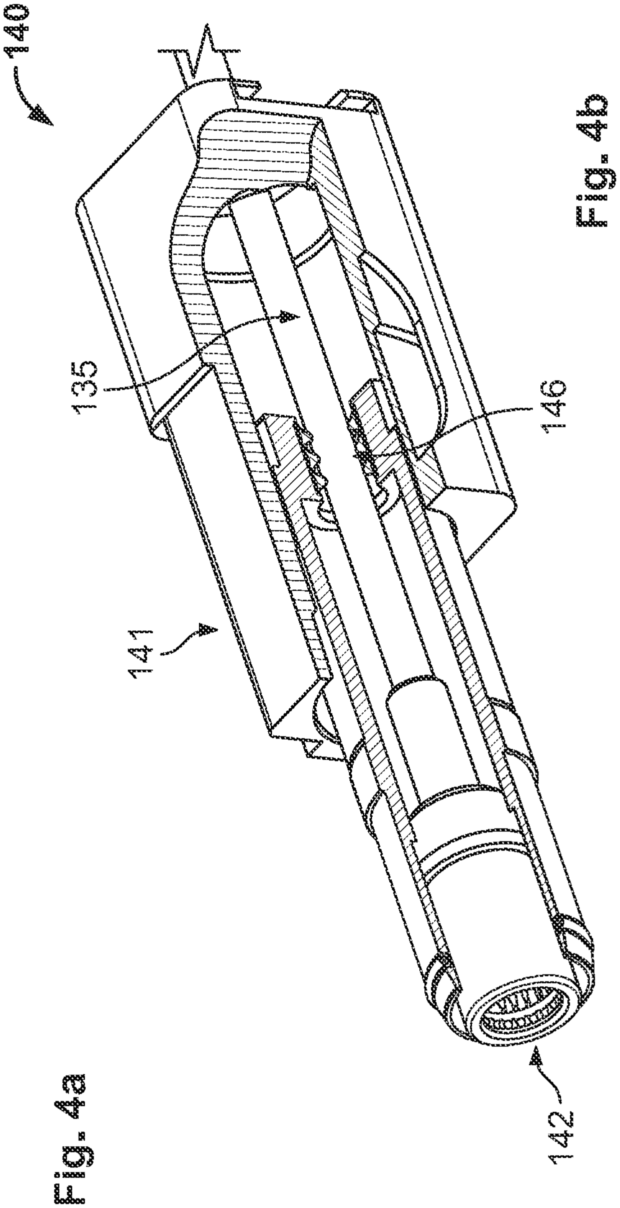
FIG. 4*b* is a sectional perspective view of the feeder cable cassette.

FIGS. 4*a* and 4*b* schematically show a specific, non-limiting embodiment of a feeder cable cassette 140 according to the present invention. The depicted feeder cable cassette 140 provides a very simple and robust terminal piece for feeder cables 130 of various wire sizes. The feeder cable cassette 140 comprises a rigid external body 141 that has openings for receiving a feeder cable 130 and for exposing an electrical contact 142. In the depicted configuration, the electrical contact 142 is provided as a female electrical contact in the form of a cylindrical socket contact.

For clarity, the non-conductive internal insert 145 and the cylindrical socket contact 142 are shown in a cut-open representation in FIG. 4*b* before being moved into the final, assembled position as shown in FIG. 4*a*. Both the non-conductive internal insert 145 and the cylindrical socket contact 142 may be adapted to different wire sizes without having to modify the external body 141 or the exposed electrical contact. The non-conductive internal insert 145 may have a rear elastomeric sealing 146 to seal the wire 135 entering the internal insert 145.

The internal insert 145 may be dimensioned and configured to accommodate various wire sizes. The elastomeric sealing 146 may be provided at the end opposite the exposed end of the internal insert 145 to accommodate various wire sizes. A different cylindrical socket contact 142 may be used for different wire sizes wherein the electrical interface, i.e. the exposed electrical contact remains standardized. It is understood that alternatively, a male configuration of the electrical contact of the feeder cable cassette 140 and a corresponding female configuration of the electrical contact of the electrical connector of the terminal cassette 110 may be chosen. However, the combination of a male configuration of the electrical contact of the terminal cassette 110 and a female configuration of the electrical contact of the feeder cable cassette 140 provides a particularly robust and secure, with respect to electrical shock prevention, configuration of the power connection system 100.

To prevent electrical shocks, the terminal surface of the electrical contact 142 is slightly, for instance up to 5 mm, recessed from the terminal surface of the internal insert 145 as shown in FIG. 4*a*. Exposing an electrical contact thus shall be understood in the present disclosure as making an electrical contact accessible for electrical connection.

In the illustrated embodiment, the non-conductive internal insert 145 protrudes from the external body 141 to be connected to a respective electrical contact 112 of the terminal cassette 110. The present invention is, however, not limited to such a configuration but also provides configurations wherein the electrical contact 112 of the terminal cassette 110 is configured as a protruding element while the non-conductive internal insert 145 of the feeder cable cassette 140 may be arranged in a recessed configuration.

The external body 141 of the feeder cable cassettes 140 may have a standardized shape to provide standardized mechanical and electrical interfaces for the terminal cassettes 110. To ensure a secure mechanical connection between the feeder cable cassette 140 and the double locking system 114 of the terminal cassette 110, the external body 141 is provided with first engaging elements 144 and second engaging elements 143 as shown in FIG. 4*a*. In the illustrated embodiment, the first and second engaging elements 143, 144 are provided on both sides, i.e. left and right, of the external body 141 such that opening and closing the double locking system 114 can be performed without affecting adjacent feeder cable cassettes 140. Furthermore, the first and second engaging elements 143, 144 are formed as integral parts of the external body 141 to be more robust.

The at least one second engaging element 143 may in particular be arranged so as to secure the electrical contact of the respective terminal cassette 110 in abutment with the respective electrical contact of the electrical connector of the respective terminal cassette 110 when the respective locking bracket 117 is in the locked position. Consequently, the at least one the second engaging element 143 is structurally different from the at least one first engaging element 144. In other words, the external body may have at least two separate engaging elements 143, 144 for mechanically engaging the locking bracket 117 and the cam 118 of the double locking system 114 of a respective terminal cassette 110.

As mentioned above, one or more protrusions of the external body, pins, recesses, holes, or the like may be provided as the at least one second engaging element 143 configured to mechanically engage respective elements of the locking bracket 117 such as the above-mentioned one or more recesses, cams, clamps, clips, loops, hooks, or the like. The at least one second engaging element 143 may in particular be integrally formed with the external body to be more robust. By way of example, protrusions may be formed on two opposite sides of the external body to mechanically engage with a corresponding clamp or hook of the locking bracket.

The locking bracket 117 and the at least one second engaging element 143 of the feeder cable cassette 140 may be configured such that a positive fit may be established between the at least one second engaging element 143 and the locking bracket 117, more specifically one or more corresponding engaging elements of the locking bracket 117, by pivoting the locking bracket 117 into the locked position. Furthermore, arrangement and shape of the at least one second engaging element 143 may be such that the feeder cable cassette 140 upon mechanical engagement with the locking bracket 117 is secured against slipping out of mechanical and electrical contact with the terminal cassette 110. In other words, the at least one second engaging element 143 may be arranged so as to secure the electrical contact of the respective terminal cassette in abutment with the respective electrical contact of the electrical connector of the respective terminal cassette 110 when the respective locking bracket 117 is in the locked position.

By using a double locking system 114, the respective feeder cable cassette 140 can be secured in a connected position with respect to vibrations and other forces that may occur in the respective field of application. Therefore, a reliable electrical connection between the feeder cable 130 and the electrical connector 111 can be guaranteed. The mechanical connection between the feeder cable cassette 140 and the terminal cassette 110 can be established without the use of screws or other loose connection means that may pose a risk as potential FOD. Furthermore, mechanically engaging the feeder cable cassette 140 instead of directly engaging the feeder cable 130 makes it possible to maintain the electrical connection between the electrical contacts of the feeder cable 130 and the terminal cassette 110 without any spring effect on the feeder cable 130 that, in the long run, may lead to fretting corrosion of the electrical contacts and damage of the feeder cable 130 due to vibrations. As a result, cylindrical electrical contacts 112 may be used in the below described power connection system 100, even in an environment with high safety standards such as aircraft. The double locking system 114 allows for a quick connection ensuring secure mating of the electrical contacts of the feeder cable cassette 140 and the terminal cassette 110. Due to the modularity of the system, a nearly arbitrary number of configurations of a corresponding power connection system 100 may be realized.

The first engaging elements 144 according to the depicted embodiment are formed as recesses on the sides of the external body 141 that have a sloped contact surface for mechanical engagement of a respective cam 118 as shown in FIG. 3*a*. After bringing the terminal surface of the electrical contact 142 into contact with the respective electrical contact 112 of the terminal cassette 110, the cam 118 is pushed down by hand such that a slanted side of the cam 118 slides along the sloped contact surface of the first engaging elements 144. As a result, the feeder cable cassette 140 is pulled into tight contact with the terminal cassette 110 wherein the cylindrical socket contact 142 is pushed into the internal insert 145 until abutting on an inner rim constricting the bore of the internal insert 145 as shown in FIG. 4*b* and the internal insert 145 is pushed further into the feeder cable cassette 140 until abutting on a distal end of the external body 141 of the feeder cable cassette 140.

The at least one first engaging element 144 provides a positive locking with the cam 118 when the double locking system 114 is in the locked position. The at least one first engaging element 144 may be formed for instance, as one or more protrusions, recesses, pins, holes or the like. The at least one first engaging element 144 may be formed as an integral part of the external body 141 to provide a robust engaging element.

Furthermore, the external body 141 comprises a nose-like protrusion 143 protruding into the recessed area of the external body to mechanically engage a respectively formed recess or hook 123 of the locking bracket 117 as shown in FIGS. 8*b* and 8*c*. Both, the sloped contact surface of the first engaging elements 144 and the nose of the second engaging elements 143 provide a positive lock between the external body 141 and the double locking system 114 such that the feeder cable cassette 140 is secured against slipping out of mechanical contact. Due to the inventive locking system 114, no loose parts such as screws are needed.

Finally, the illustrated embodiment of the feeder cable cassette 140 is provided with a metallic or metallized chimney 147 for shielding against EMI, as shown in FIG. 4*a*. Likewise, the external body 141 may be metallized, such as a metallized composite material, e.g. metallized thermoplastic, to provide shielding. Use of a rigid external body 141 that provides a standardized mechanical interface further avoids the well-known problem of disorientation between wired contacts and terminal cassettes.

Figure 5A:
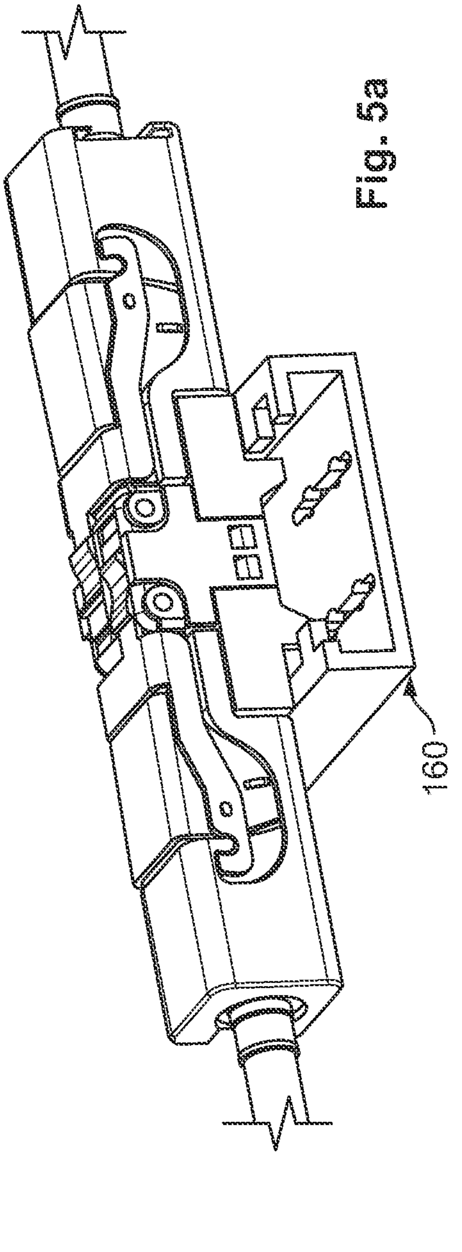
FIG. 5*a* is a perspective view of a terminal cassette connected to two feeder cable cassettes.
Figure 5B:
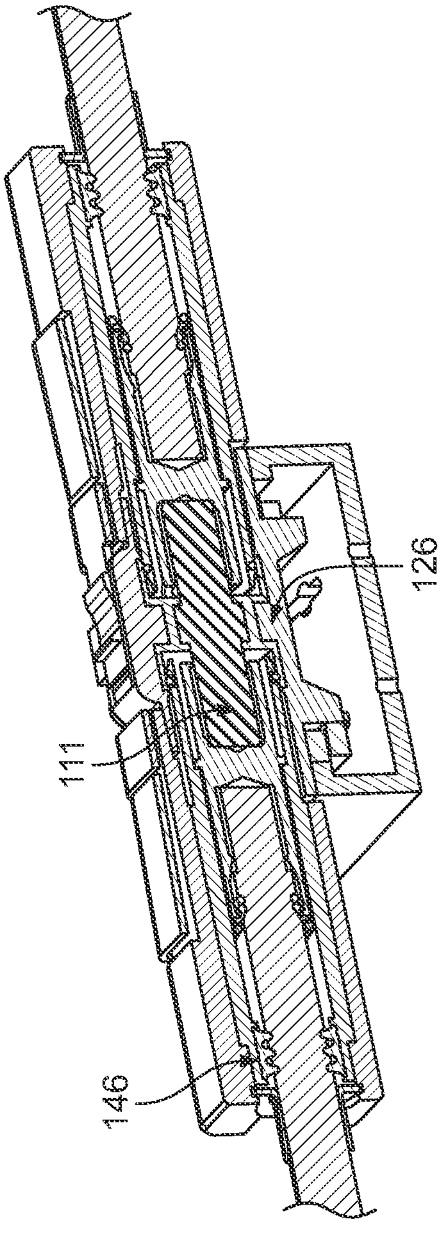
FIG. 5*b* is a sectional perspective view of the terminal cassette connected to two feeder cable cassettes.

FIGS. 5*a* and 5*b* show a three-dimensional and cross-sectional view of a terminal cassette 110 with two feeder cable cassettes 140 connected to either side of the terminal cassette 110 mounted on the modular rail fixture 160. The cross-sectional view of FIG. 5*b* clearly shows the positive fit of the body 126 of the terminal cassette 110 with respective elements 162 of the modular rail 160.

The depicted feeder cable cassettes 140 are fully locked to the terminal cassette 110 as can be seen in FIG. 5*a*. The cams 118 are in tight frictional engagement with the sloped contact surfaces of the recesses of the first engaging elements 144 as a result of the leverage effect of the locking bracket 117. When moving the locking bracket 117 into the locked position, the recesses 123 of the locking bracket 117 engage the protrusions 143 of the external body 141 of the feeder cable cassettes 140 as shown in FIGS. 8*b* and 8*c* such that the cam 118 is firmly pressed into the recesses 144 of the external body. The sliding locking devices 116 then secure the elastically deformable lever of the locking bracket 117 and expose a colored visual control element 125 as shown in FIG. 8*d*.

The locking bracket 117 and the sliding locking device 116 are configured to mechanically engage respective elements of the feeder cable cassette 140 and the locking bracket 117, respectively, without the use of screws. To this end, the locking bracket 117 and/or the sliding locking device 116 may be designed to provide positive locking with corresponding elements. By way of example, the locking bracket 117 may comprise one or more recesses, cams, clamps, clips, loops, hooks, or the like to engage corresponding protrusions, pins, recesses, holes, hooks, or the like of the feeder cable cassettes 140. The sliding locking device 116 may in particular, be configured as a slider that, when in a locked position, mechanically blocks a corresponding part of the locking bracket 117 from moving out of its locked position.

The cross-sectional view of FIG. 5*b* further shows the electrical connection between the electrical connector 111 of the terminal cassette 110 and the female electrical contacts 142 of the feeder cable cassettes 140. An elastomeric O-ring may be provided between the internal inserts 145 of the feeder cable cassettes 140 and the body 126 of the terminal cassettes 110 to seal the electrical connection between the feeder cable cassettes 140 and the terminal cassettes 110.

Figure 6A:
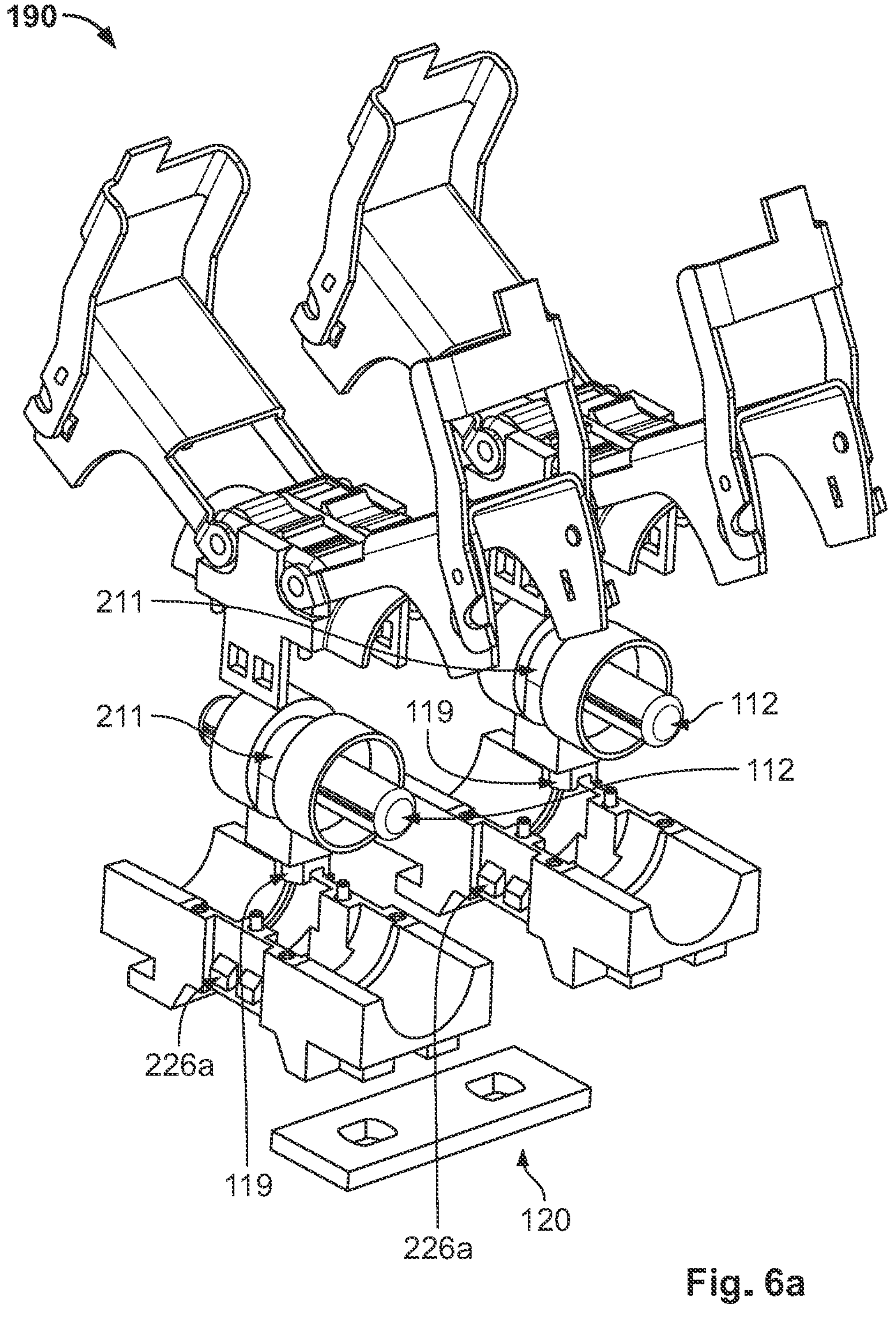
FIG. 6*a* is an exploded perspective view of a power distribution terminal cassette according to an embodiment.
Figure 6B:
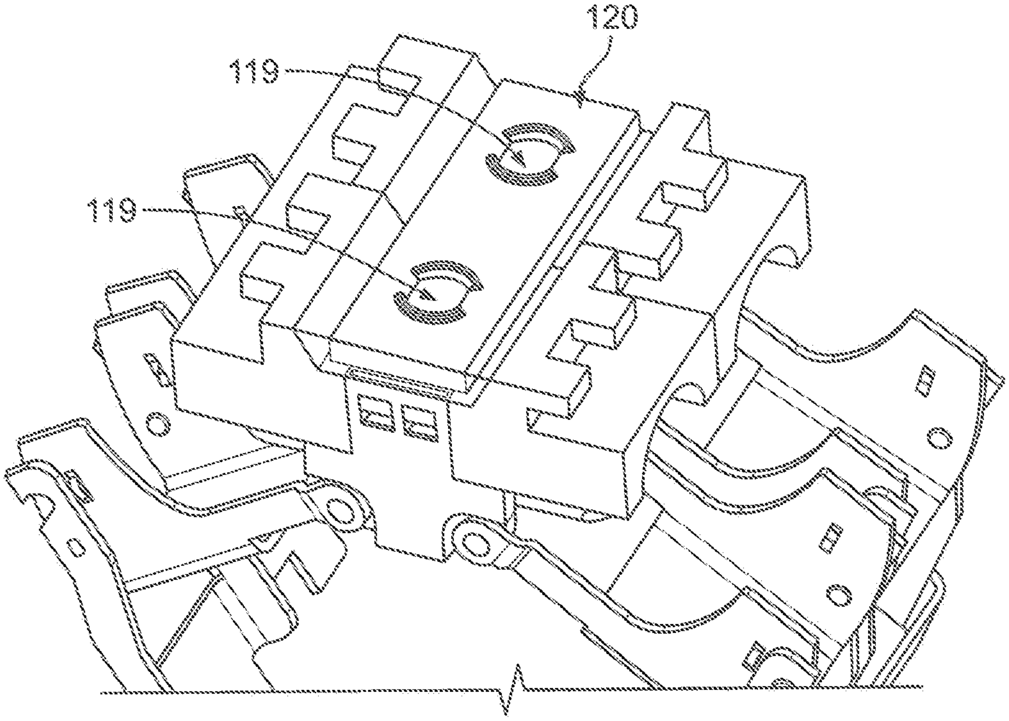
FIG. 6*b* is a perspective view of the power distribution terminal cassette.

FIGS. 6*a* and 6*b* show a variant of the terminal cassette of FIGS. 3*a* and 3*b* that is used to form a power distribution terminal cassette 190 as schematically shown in FIGS. 6*a* and 6*b*. In the illustrated, non-limiting example, two adjacent terminal cassettes 110 are electrically connected using a shunt bar 120 to form a power distribution terminal cassette 190. It is understood that more than two adjacent terminal cassettes 110 may be connected using a corresponding shunt bar 120.

Shape and construction of the terminal cassettes 110 of FIGS. 6*a* and 6*b* are largely identical to shape and construction of the terminal cassettes 110 of FIGS. 3*a* and 3*b* such that a repeated description is omitted for the sake of clarity. In the illustrated example, only the lower body parts 226*a* and the electrical connectors 211 are modified to allow shunting the electrical connectors 211 of two or more adjacent modular cassettes 110.

In addition to the two male electrical contacts 112, the modified electrical connectors 211 of the depicted terminal cassettes 110 have a shunt contact 119 that extends to the lower side of the terminal cassette 110. In addition, the lower body part 226*a* of the terminal cassette 110 is provided with a through hole to insert the shunt contact 119. In the depicted embodiment, the shunt contact 119 reaches through the through hole into respective openings of the shunt bar 120. The shunt contacts 119 may be press fitted and/or riveted to the shunt bar 120 to avoid using screws or other loose parts. Finally, the shunt bar 120 may be covered by a non-conductive layer, such as an epoxy resin filling, to protect the shunt bar 120 and to seal the assembly.

Shunting two or more adjacent terminal cassettes 110 as described above creates a power distribution terminal cassette 190 that may be used for power distribution according to a variety of configurations.

As mentioned above, each of the terminal cassettes 110 of the power connection system may have the same structure such that each of the terminal cassettes 110 is formed with the through hole for a shunt contact 119. Alternatively, different types of terminal cassettes 110 may be used wherein only some of the terminal cassettes 110 have the through hole. The through hole may for instance, be arranged at a side of the terminal cassette 110 opposite the side of the terminal cassette 110 where the double locking system 114 is arranged. By way of example, the through hole may be provided in a bottom side of the terminal cassette 110 while the double locking system 114 are arranged on a top side of the terminal cassette 110. To establish a shunt connection between the electrical connectors of the two or more adjacently arranged terminal cassette 110, the electrical connectors, in addition to the at least two electrical contacts, have a shunt contact 119 electrically connected to the at least two electrical contacts 112.

Figure 7:
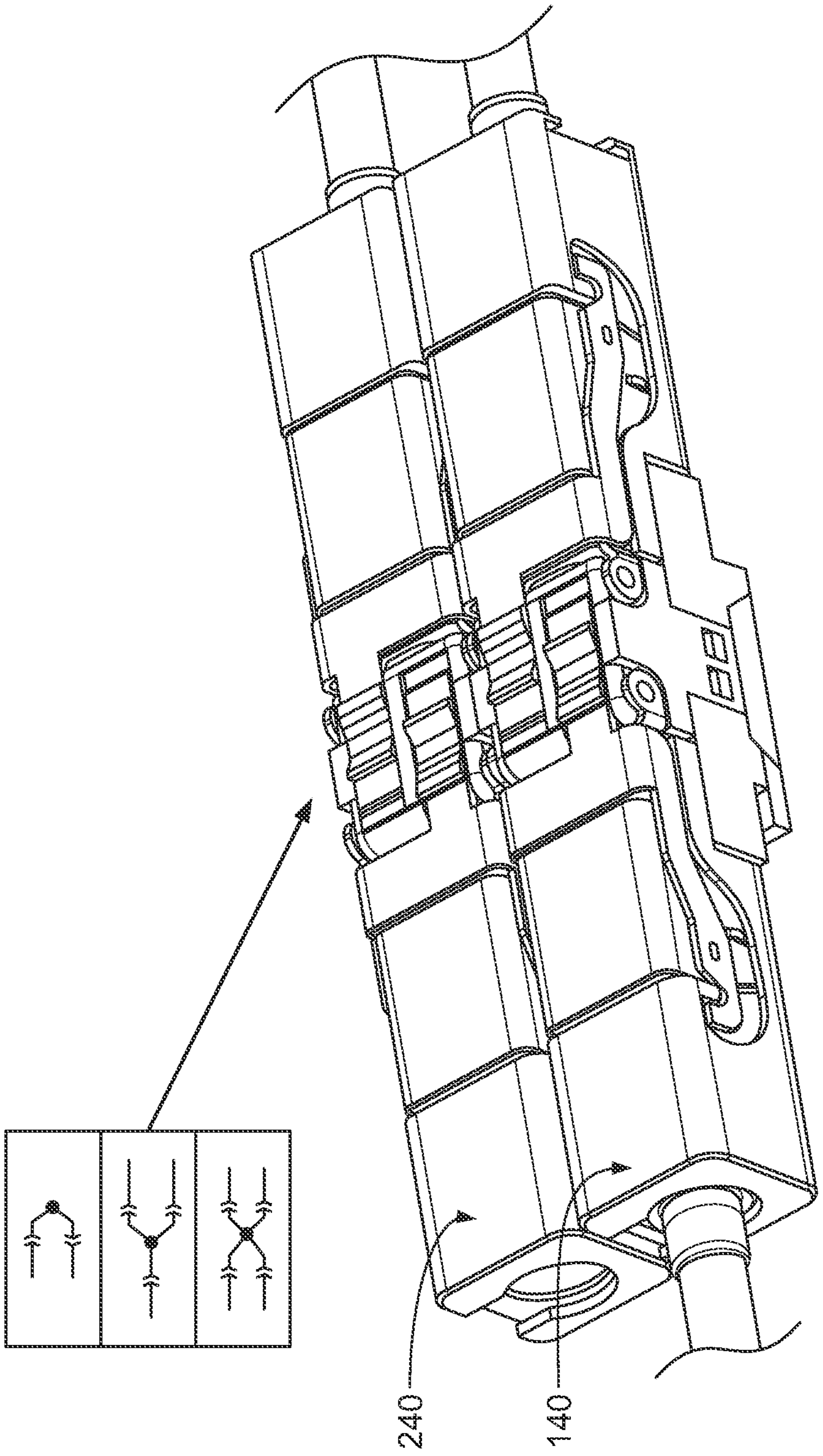
FIG. 7 is a perspective view of the power distribution terminal cassette connected to feeder cables.

Examples of such configurations are shown in FIG. 7 that additionally shows an exemplary configuration wherein a single feeder cable 130 is connected on one side of the power distribution terminal cassette 190 as an electrical input and wherein two feeder cables 130 are connected as electrical outputs on the opposite side of the power distribution terminal cassette 190. As a result, a bifurcation is created using a shunt bar 120 for two adjacent terminal cassettes 110. The remaining, unused electrical contact of the power distribution terminal cassette 190 may be protected by connecting a filler cassette 240 that has the same mechanical structure as the feeder cable cassettes 140 but does not provide an electrical contact. Further exemplary configurations wherein all feeder cables 130 are connected on one side of the power distribution terminal cassette 190 or two input feeder cables 130 are jointly connected to two output feeder cables 130 are shown in the insert of FIG. 7. Longer shunt bars 120 allow for a nearly unlimited number of power distribution configurations.

FIGS. 8*a-d* schematically show the connection kinematic for connecting a feeder cable cassette 140 to a terminal cassette 110. As a first step, the feeder cable cassette 140 is brought into mechanical contact with the terminal cassette 110 as shown in FIG. 8*a* by inserting the male electrical contact 112 of the terminal cassette into the female electrical contact 142 of the feeder cable cassette. Conveniently, the electrical contact 112 does not have to be fully inserted as full mechanical and electrical contact is established according to the present invention by using the disclosed double locking system 114.

In a second step, the cam 118 that is pivotably arranged on pivot points 121 on either side of the upper part of the body of the terminal cassette 110 is pushed down along the contact surface 144 of the first engaging element of the external body of the feeder cable cassette 140 as shown in FIG. 8*b*. As a result of this downward movement of the cam

118, the feeder cable cassette 140 is pulled further into mechanical and electrical contact with the terminal cassette 110.

It is understood that the downward movement of the cam 118 does not have to be performed all the way into the recesses 144 but can remain incomplete as shown in FIG. 8*c*. The final part of the downward movement can be completed by use of the locking bracket 117. As the locking bracket 117 is pivotably mounted on pivot points 122 provided on a distal end of the cam 118, a leverage effect can be achieved by pushing the inner lever of the locking bracket 117 downward as shown by the arrow in FIG. 8*c*. In response to this downward movement, the outer lever of the locking bracket 117, more specifically two recesses 123 arranged on the outer lever, are brought into mechanical engagement with two corresponding engaging elements 143 of the external body 141 of the feeder cable cassette 140. As a result of the mechanical engagement and the downward movement, the cam 118 is pushed further down into its final position. The cam 118 may further comprise a stop element 124 on each side to stop the locking bracket 117 from pivoting beyond a certain point as shown in FIG. 8*a*.

As described above, the inner lever of the locking bracket 117, or at least part of this lever such as the leaf shown in FIG. 8*c*, may be formed of an elastic material such as a thin metal that can be manually deformed. By arranging the pivot points 122 slightly shifted vertically upwards with respect to the respective points of the protruding elements 143, a slight deformation of the inner lever of the locking bracket 117 is required to push the locking bracket 117 into the locked position as shown in FIG. 8*d*. As a result of the elasticity of this inner lever, a residual spring effect is created that is counteracted by sliding the sliding locking device 116 over an end part of the inner lever such as the leaf as shown in FIG. 8*d*. The sliding locking device 116 may further be provided with a spring that provides a restoring force on the sliding locking device 116 in the direction of the arrow shown in FIG. 8*d*. Consequently, the sliding locking device 116 has to be actively retracted into an open position to admit moving the inner lever into the locked position. The restoring force of the above-mentioned spring will then secure the sliding locking device 116 and consequently the locking bracket 117 in the locked position. Finally, visual control elements 125 are provided on top of the body of the terminal cassette as shown in FIG. 8*d* that are only visible when the sliding locking device 116 is in the locked position.

For disconnecting the feeder cable cassette 140 from the terminal cassette 110, the sliding locking device 116 is manually retracted to release the locking bracket 117. Due to the elastic deformation of the inner lever of the locking bracket 117, a small spring relaxation can be observed when retracting the sliding locking device 116. The locking bracket 117 may then be manually pivoted back and the cam 118 pulled out of the recesses 144 of the external body of the feeder cable cassette 140. As schematically shown in FIGS. 7 and 8*a-d*, the upper surface of the external body 141 of the feeder cable cassette 140 may be formed with a relief or profiled structure that has depressed or recessed areas for receiving respective upper parts of the cam 118 and the locking bracket 117. The surface may in particular be structured such that the external body, the cam 118 and the locking bracket 117 form an essentially smooth surface in the locked position. As an additional benefit, the relief structure of the upper surface of the external body may be used to manually pull the feeder cable cassette 140 out of mechanical contact with the terminal cassette 110.

Performing cable repairs for conventional terminal blocks is difficult because typically all connected feeder cables 130 must be cut and rearranged after cutting due to their reduced length. The present invention further simplifies cable repairs as the disclosed feeder cable cassette system makes it possible to cut only the damaged feeder cable 130. Furthermore, an extended length feeder cable cassette may be used as the terminal piece of the cut feeder cable to avoid rearranging the feeder cable 130.

Figure 9A:
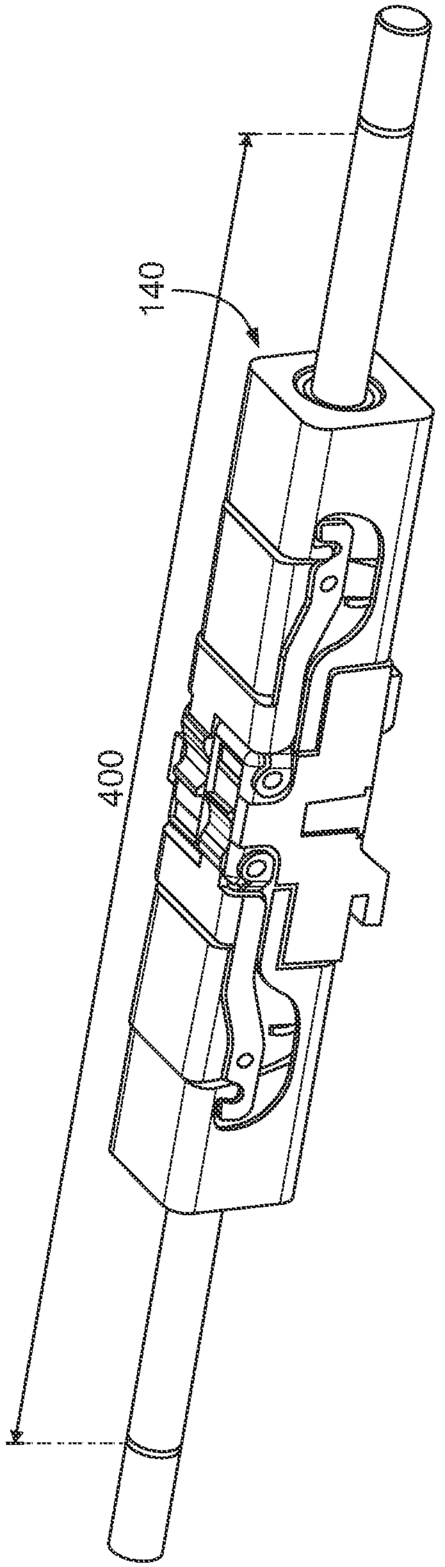
FIG. 9*a* is a perspective view of a first step of a cable repair process using a repair cassette according to an embodiment.
Figure 9B:
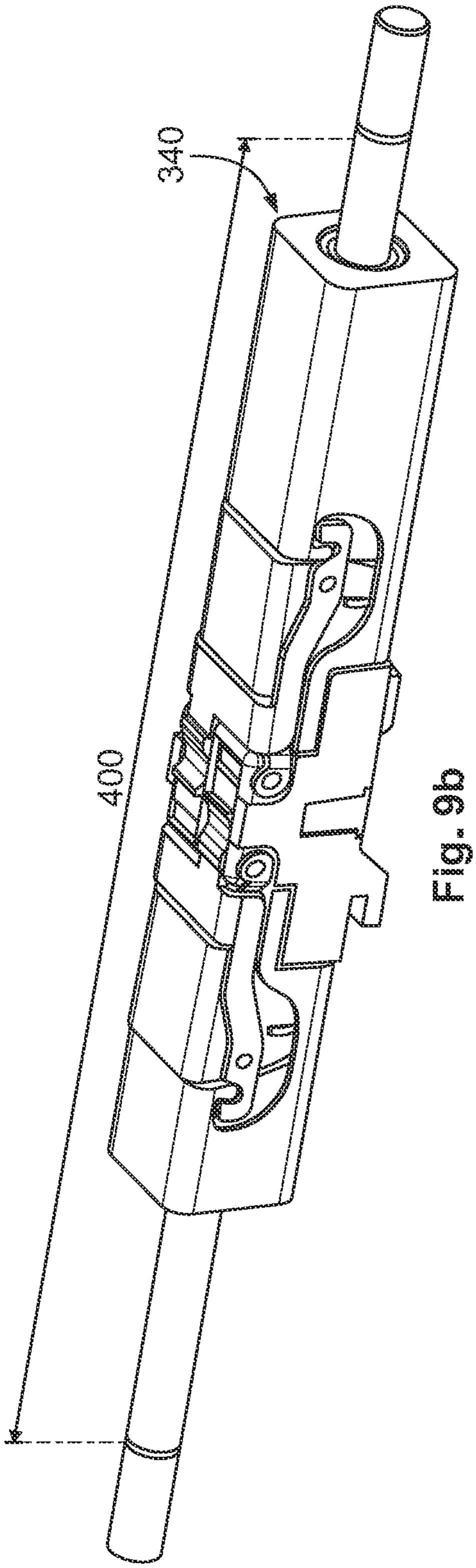
FIG. 9*b* is a perspective view of a second step of the cable repair process.

FIGS. 9*a* and 9*b* schematically show the repair of a single damaged feeder cable. To demonstrate the principle, respective marks are indicated on the feeder cables on both sides. If the right-hand side feeder cable is damaged, the respective feeder cable cassette 140 is first disconnected as described above and removed by cutting the feeder cable. Subsequently, a longer feeder cable cassette 340 that otherwise has the same structure and shape, and in particular provides the same locking mechanism, is attached to the end of the feeder cable as described above with regard to FIGS. 4*a* and 4*b*. The extended repairing cassette 340 is then connected to the vacant electrical contact of the terminal cassette in the usual way. Internally, the repairing cassette 340 may be provided with an extended cylindrical socket contact for connection to the end of the cut feeder cable.

In an embodiment of the power connection system 100, each of the terminal cassettes 110 may have the same constructive design and each of the feeder cable cassettes 140 may have the same constructive design. Alternatively, as mentioned above, the terminal cassettes 110 and/or the feeder cable cassettes 140 may have different configurations with regard to the number and arrangement of electrical contacts 112 while their electrical and mechanical interfaces remain standardized.

The present disclosure provides a highly versatile and easy-to-install power connection system with standardized mechanical and electrical interfaces. The system is lightweight and at the same time very robust, in particular with respect to the above-described specific requirements of the targeted installation environments. As no loose parts are used for the mechanical connection of the terminal cassettes 110 and the feeder cable cassettes 140, the risk of damage by FOD is significantly reduced. The inventive double locking system 114 further provides a quick connection mechanism which guarantees secure mating and cable alignment. No tools are needed to connect or disconnect the feeder cable cassettes 140. The components may be configured to provide EMI shielding. The power connection system can be scaled for application in different technical environments such as aircraft, automotive environments or offshore installations.

The present disclosure further provides a method for connecting a feeder cable cassette 140 to a terminal cassette 110 of a power connection system according to any one of the above-described embodiments, the method comprising: pulling a locking bracket 117 and a respective cam 118 of the terminal cassette 110 into an open position, bringing an electrical contact of the feeder cable cassette 140 into contact with a respective electrical contact of the terminal cassette 110, and pushing the cam 118 and the locking bracket 117 into the locked position.

This method may be particularly intuitive for a human operator if the double locking system 114 is provided on the top side of the terminal cassette 110 as described above. As an initial step, the terminal cassette 110 is prepared for receiving a respective feeder cable cassette 140 by pulling the locking bracket 117 and the cam 118 of the respective double locking system 114 up into an open position, bringing the feeder cable cassette 140 into contact with the terminal cassette 110 and pushing the cam 118 and the locking bracket 117 into the locked position.

The present invention provides a fast and simple method for reliably connecting feeder cable cassettes 140 to a terminal cassette 110 where a visual control element 125 may be provided to facilitate checking the lock of the double locking system 114. No extra tools are needed to connect the feeder cable cassettes 140 to the terminal cassettes 110.

What is claimed is:

1. A terminal cassette for electrically connecting a plurality of feeder cables, comprising:

an electrical connector with a plurality of electrical contacts; and a double locking system securing a feeder cable cassette, the double locking system has a locking bracket and a sliding locking device, the locking bracket pivots and engages the feeder cable cassette, the sliding locking device secures the locking bracket in a locked position.

2. The terminal cassette of claim 1, wherein the double locking system has a visual control element visible when the sliding locking device is in the locked position.

3. The terminal cassette of claim 1, wherein the locking bracket is elastically deformable.

4. The terminal cassette of claim 1, further comprising a body at least partly encasing the electrical contacts.

5. The terminal cassette of claim 4, wherein the double locking system has a cam pivotably mounted on the body and the locking bracket is pivotably mounted on a distal part of the cam with respect to a pivot point of the cam.

6. A power connection system, comprising:

a plurality of feeder cable cassettes; and a terminal cassette including an electrical connector with a plurality of electrical contacts and a double locking system securing one of the feeder cable cassettes, the double locking system has a locking bracket and a sliding locking device, the locking bracket pivots and engages the feeder cable cassette, the sliding locking device secures the locking bracket in a locked position, the feeder cable cassettes connect a plurality of feeder cables to the terminal cassette.

7. The power connection system of claim 6, wherein the terminal cassette is one of a pair of terminal cassettes each having a through hole in a body, the through hole receives a shunt contact of the electrical connector.

8. The power connection system of claim 7, wherein a power distribution terminal cassette is formed by shunting adjacent terminal cassettes with a shunt bar.

9. The power connection system of claim 6, further comprising a modular rail fixture, the terminal cassette is fixed by positive locking on the modular rail fixture.

10. The power connection system of claim 9, wherein the modular rail fixture has an end clamp fixture at each end of the modular rail fixture.

11. The power connection system of claim 6, wherein each of the feeder cable cassettes has an external body with an opening receiving one of the feeder cables and exposing an electrical contact of the feeder cable cassette.

12. The power connection system of claim 11, wherein the external body has a first engaging element engaging a cam of one of the terminal cassettes.

13. The power connection system of claim 12, wherein the first engaging element and the cam pull the electrical contact of the feeder cable cassette into abutment with one of the electrical contacts of the electrical connector of the terminal cassette upon moving the locking bracket into the locked position.

14. The power connection system of claim 11, wherein the external body has a second engaging element engaging the locking bracket.

15. The power connection system of claim 14, wherein the second engaging element secures the electrical contact of the feeder cable cassette in abutment with the one of the electrical contacts of the electrical connector of the terminal cassette when the locking bracket is in the locked position.

16. A method for connecting a feeder cable cassette to a terminal cassette, comprising:

pulling a locking bracket and a cam of the terminal cassette into an open position;

bringing an electrical contact of the feeder cable cassette into contact with an electrical contact of the terminal cassette; and pushing the cam and the locking bracket into a locked position, the pushing step includes first pushing the cam into engagement with a first engaging element of an external body of the feeder cable cassette.

17. The method of claim 16, wherein the pushing step includes subsequently pivoting the locking bracket into engagement with a second engaging element of the external body.

18. The method of claim 17, wherein the locking bracket is elastically deformed when pushing the locking bracket into the locked position and is secured by sliding a sliding locking device of the terminal cassette into the locked position.

19. The method of claim 18, wherein disconnecting the feeder cable cassette from the terminal cassette includes retracting the sliding locking device to release the locking bracket.

* * * * *